US00RE38048E

(19) United States
(12) Reissued Patent
Kawarai et al.

(10) Patent Number: US RE38,048 E
(45) Date of Reissued Patent: Mar. 25, 2003

(54) MAGNETIC RECORDING MEDIUM

(75) Inventors: Seigi Kawarai, Hyogo (JP); Kenichiro Yoshida, Osaka (JP); Akira Kato, Ibaraki (JP)

(73) Assignee: Hitachi Maxell, Ltd., Osaka (JP)

(21) Appl. No.: 09/109,202

(22) Filed: Jul. 2, 1998

Related U.S. Patent Documents

Reissue of:
(64) Patent No.: 5,532,042
Issued: Jul. 2, 1996
Appl. No.: 08/310,043
Filed: Sep. 22, 1994

U.S. Applications:

(63) Continuation of application No. 07/613,708, filed on Jan. 17, 1991, now abandoned.

(30) Foreign Application Priority Data

Apr. 5, 1989 (JP) ..... 1-86157

(51) Int. Cl.[7] ..... G11B 5/66; B32B 3/10; B32B 5/16

(52) U.S. Cl. ..... 428/141; 428/323; 428/336; 428/694 B; 428/694 BA; 428/694 BC; 428/694 BB; 428/694 BR; 428/694 BN; 428/694 ST; 428/694 SG; 428/900; 428/328; 428/332; 428/928; 428/329

(58) Field of Search ..... 428/694 B, 694 BA, 428/694 BC, 694 BB, 694 BR, 694 BN, 694 ST, 694 SG, 323, 329, 336, 141, 900

(56) References Cited

U.S. PATENT DOCUMENTS 4,555,431 A * 11/1985 Miyatsuka ..... 428/141
4,687,703 A * 8/1987 Miyoshi et al. ..... 428/323
4,741,954 A * 5/1988 Ide ..... 428/323

FOREIGN PATENT DOCUMENTS

JP 47-18572 * 5/1972
JP 48-15003 * 5/1973
JP 49-39402 * 10/1974
JP 52-17404 * 5/1977
JP 52-28642 * 7/1977
JP 52-49961 * 12/1977
JP 55-15771 * 4/1980
JP 57154618 9/1982
JP 59117768 7/1984
JP 60-32122 * 2/1985
JP 60025023 2/1985
JP 60-12688 * 4/1985
JP 6059527 4/1985
JP 61-37761 * 8/1986
JP 62-08328 * 1/1987
JP 62-38525 * 2/1987
JP 62-38526 * 2/1987
JP 62-38527 * 2/1987
JP 62-38528 * 2/1987
JP 63184916 7/1988

* cited by examiner

*Primary Examiner*—Leszek Kiliman
(74) *Attorney, Agent, or Firm*—Birch, Stewart, Kolasch & Birch, LLP

(57) ABSTRACT

There is provided a magnetic recording medium which comprises a substrate, a magnetic layer on one surface of a substrate and a backcoating layer on the other surface of the substrate, wherein the magnetic layer contains a magnetic metal powder having a major axis of not larger than 0.2 $\mu$m and an inorganic powder having a Mohs' hardness of at least 5, and the backcoating layer contains an inorganic powder having a particle size smaller than the size of the major axis of the magnetic metal powder and which has sufficiently reduced noise at high density recording and high output required in, for example, a small size video tape with high picture quality, the magnetic recording medium in the form of a magnetic tape having a total thickness of not larger than 14 $\mu$m inclusive of the substrate, the magnetic layer and the backcoating layer, and reliably maintained not to increase the noise after long term storage.

39 Claims, No Drawings

MAGNETIC RECORDING MEDIUM

Matter enclosed in heavy brackets [ ] appears in the original patent but forms no part of this reissue specification; matter printed in italics indicates the additions made by reissue.

This application is a continuation, of application Ser. No. 07/613,708 filed on Jan. 17, 1991, now abandoned.

BACKGROUND OF THE INVENTION

1. Field of the Invention

The present invention relates to a magnetic recording medium with reduced noise at high density recording and high Output which are required in, for example, a small size video tape with high picture quality. In particular, the present invention provides a magnetic recording medium, such as a magnetic tape, which has a magnetic layer and a substrate, a backcoating layer having a total thickness of not greater than 14 μm used in a wound form, such that the noise does not increase after long term storage.

2. Description of the Related Art

In general, a magnetic recording medium comprises a substrate made of, for example, a polyester film and a magnetic layer formed on a surface of the substrate by applying a magnetic paint which comprises a magnetic powder, a binder, inorganic powder, a lubricant and the like dispersed in an organic solvent and drying it. In particular, in case of a video tape, a backcoating layer comprising a binder, inorganic powder, a lubricant and the like is formed on a back of the substrate to improve running properties.

To prevent abrasion during contact to a magnetic head or guide rollers, it is proposed to add inorganic powder having a Mohs' hardness of 5 or higher to both the magnetic layer and the backcoating layer.

The addition of the inorganic powder having Mohs' hardness of 5 or higher to the backcoating layer is disclosed in Japanese Patent Kokai Publication Nos. 112/1987, 38525/1987, 38526/1987, 38527/1987 and 38528/1987 and the addition of the inorganic powder having Mohs' hardness of 5 or higher to the magnetic layer is disclosed in Japanese Patent Publication Nos. 1857/1972, 15003/1973, 39402/1974, 28642/1977, 49961/1977 and 15771/1980.

To achieve a high density recording, it is necessary to shorten the recording wavelength. Therefore, the magnetic powder having a particle size smaller than the recording wavelength is used.

To obtain high output, many proposals have been made to improve magnetic characteristics. For example, Japanese Patent Publication No. 37761/1986 discloses the use of ferromagnetic metal powder having high saturation magnetization to achieve high output.

In addition, to decrease the noise, Japanese Patent Publication Nos. 17404/1977 and 12688/1985 disclose finishing of the surface of the magnetic layer by a super calendering treatment to smoothen the surface.

However, while the magnetic recording medium, which comprises the ferromagnetic metal powder as a magnetic recording element and is produced by surface finishing, has a low original noise, the noise increases after storage.

This problem is remarkable when the magnetic powder has a small particle size and a metal magnetic powder which is softer than iron oxide base magnetic powder is used, and it is found that the noise against a signal has a frequency corresponding to recording wavelengths not longer than about 0.8 μm. This problem is found in almost all prototype magnetic recording media, while the prototype magnetic recording media having no backcoating layer keeps the original low noise.

Therefore, the present inventors thinking that this problem might be caused by the backcoating layer have made extensive study to find that surface roughness of the backcoating layer could be transferred to the surface of the magnetic layer when the magnetic recording medium is wound and the transferred roughness might cause noise.

It was found that the increase of noise was remarkable in a winding type magnetic recording medium having a total thickness of 14 μm or less of the substrate, the magnetic layer and the backcoating layer. This is because such a thin magnetic recording medium is wound in a larger number of turns than a thick magnetic recording medium having a total thickness of about 20 μm in a unit winding diameter, and a near hub, winding force is larger.

Japanese Patent Kokai Publication No. 32122/1985 describes the similar phenomena and proposes to prevent flaws of tape guides by using a combination of inorganic powder having Mohs' hardness of 5 or higher and a particle size of not larger than 0.2 μm and a soft inorganic powder in an amount larger than the former inorganic powder.

Japanese Patent Kokai Publication No. 255584/1988 recognizes the decrease of S/N and C/N of the magnetic recording medium by the transfer of the surface roughness of the backcoating layer to the surface of the magnetic layer and describes that an amount of a solvent remained in the magnetic layer may relate to this problem.

However, the above patent literature relates to cobalt-containing iron oxide magnetic powder and a VHS type magnetic recording medium having the total thickness of about 20 μm of the substrate, the magnetic layer and the backcoating layer. Since in the VHS system, the shortest recording wavelength of the white level is only 1.3 μm, the above patent literature does not suggest the decrease of noise in the magnetic recording medium which comprises the ferromagnetic metal powder as the magnetic recording element and uses a center recording wavelength of 0.8 μm.

SUMMARY OF THE INVENTION

It has been determined that the affects on the magnetic and backcoating layer depends not only on the hardness of the particles contained in the layers but also on particle size, and that the reinforcing effect of the particles is decreased when the particle size is smaller than a specific size. In view of this fact, it has been further found that in order to prevent damage of the surface of the magnetic layer by the inorganic powder having a Mohs' hardness of 5 or higher, which is contained in the backcoating layer when the medium is wound, the inorganic powder in the backcoating layer should have a particle size smaller than a major axis of the metal magnetic powder.

Second, to improve the running properties, the backcoating layer should contain carbon black. This is disclosed in Japanese Patent Kokai Publication No. 8328/1987 which proposes improvement of running durability of the magnetic recording medium by the addition of fine carbon black having a particle size of from 10 to 30 mμ and coarse non-magnetic powder having a particle size of 200 to 500 mμ to the backcoating layer whereby increase of drop out is prevented.

However, this patent literature is silent on the relationship between the primary particle size or particle size of agglomerates of the carbon black and the major axis size of the ferromagnetic metal powder in the magnetic layer, or does not investigate the relationship between the the primary particle size or particle size of agglomerates of the carbon black and the noise against the signal having a frequency corresponding to the recording wavelength of 0.8 μm or less when the ferromagnetic metal particles have a small particle size.

Then, in the course of completing the present invention, the relationship between the primary particle size or particle size of agglomerates of the carbon black and the major axis size of the ferromagnetic metal powder in the magnetic layer has been studied, and it has been made clear that, when the primary particle size or particle size of agglomerates of the carbon black is larger than the ferromagnetic metal powder, the requirement for the low noise at the high output is fulfilled.

This is remarkable in the magnetic recording medium which is required to have a high recording density, in particular which comprises a magnetic layer having a thickness of not larger than about 3.0 μm for satisfying the requirement for a thinner magnetic layer.

DETAILED DESCRIPTION OF THE INVENTION

According to the present invention, in order to provide a magnetic recording medium which comprises a magnetic layer and a backcoating layer on respective surfaces of a non-magnetic substrate, and to achieve high output and suppress an increase of noise in high density recording at a center recording wavelength of not longer than 0.8 μm even after long term storage, it is preferable that the magnetic layer have a squareness ratio of at least 0.85 under an applied magnetic field of 10 KOe, that the magnetic layer have a coercive force of at least 1500 Oe, that the magnetic layer have a surface roughness of not larger than 0.004 μm in terms of center line average roughness, that the backcoating layer have a surface roughness of not larger than 0.01 μm in terms of center line surface roughness, and that inorganic powder having a Mohs' hardness of 5 or higher in the backcoating layer has a particle size smaller than the major axis size of the metal magnetic powder.

It was not imagined that the carbon black in the backcoating layer damaged the surface of the magnetic layer, since it is soft. However, it has been found that carbon black having a small particle size may damage the surface of the magnetic layer, since the reinforcing effect is not sufficient in the magnetic layer containing mainly the magnetic metal particle having the major axis size of 0.2 μm or smaller to achieve high density recording at a center recording wavelength of not longer than 0.8 μm, and a strong winding force is applied to the thin magnetic recording medium for high density recording under sever condition including a large number of turns. In such a case, when the backcoating layer contains carbon black having a primary particle size or particle size larger than the major axis size of the ferromagnetic metal powder, the particles having the smaller particle size are trapped in gaps between the larger size carbon black particles, so that the smaller size particles do not protrude from the surface of the backcoating layer, Preferably, the inorganic powder having Mohs' hardness of 5 or higher contained in the backcoating layer has a particle size smaller than the major axis size of the metal magnetic powder. When the magnetic recording tape having such construction is wound around a hub made of a polyoxymethylene resin and the like, the wound tape is preferably set in a cassette casing made of an ABS resin containing a pigment having Mohs' hardness of 2 to 4.

As a material of the non-magnetic substrate to be used in the present invention, there are exemplified polyesters (e.g. polyethylene terephthalate, polyetylene 2,6-naphthalate, etc.), polyolefins (e.g. polyethylene, polypropylene, etc.), cellulose derivatives (e.g. cellulose acetate, cellulose diacetate, etc.), vinyl type resins (e.g. polyvinyl chloride, polyvinylidene chloride, etc.), polycarbonate, polyimide, and polyamide. Among them, are preferred the biaxially oriented polyesters such as polyethylene terephthalate or polyethylene 2,6-naphthalate having a Young's modulus in a longitudinal direction of at least 700 kg/mm$^2$, a Young's modulus in a width direction of at least 400 kg/mm$^2$ and a surface roughness of not larger than 0.01 μm.

On one surface of the substrate, a magnetic paint comprising the magnetic powder and the inorganic powder having a Mohs' hardness of 5 or higher which are dispersed in a binder resin dissolved in an organic solvent, is coated and dried with magnetic orientation treatment to form the magnetic layer.

Examples of the magnetic powder contained in the magnetic layer are ferromagnetic powder of metals (e.g. iron, cobalt, nickel, etc.), alloys of iron, cobalt, nickel, zinc and the like, and metal or alloy particles having a coating of an oxide of iron, aluminum or silicon.

The major axis size of the ferromagnetic metal powder is not larger than 0.8 μ in view of the center recording wavelength, preferably not larger than 0.2 μm in view of the desired resolution.

Among them, a ferromagnetic metal powder comprising iron and at least 0.1% by weight of manganese based on the weight of iron is preferred. In particular, ferromagnetic metal powder comprising iron, at least 0.1% by weight manganese based on the weight of iron and an alkaline earth metal (e.g. calcium or magnesium) in an amount of 1 to 50 times the amount of manganese is preferred, since it has relatively large hardness and good magnetic properties and electromagnetic conversion characteristics, and is hard enough to prevent the damage of the magnetic layer, which contains the magnetic powder having the major axis size not larger than 0.2 μm and achieving insufficient reinforcing effect, by the inorganic powder having a Mohs' hardness of 5 or higher on the surface of the backcoating layer.

It is preferred that manganese is present on the surfaces of the ferromagnetic powder particles in the form of an oxide or a hydroxide, since a uniform and dense coating is formed from manganese oxide or hydroxide. Alternatively, a composition of the alloy powder comprising nickel and cobalt is preferably adjusted so that a nickel weight is at least 2% by weight, and a weight ratio of cobalt to nickel is at least 110% by weight, since a decrease of saturation magnetization ($\sigma_s$) is 30% or less after the magnetic recording medium is kept standing at 60° C., 90% RH for a week. A ratio of a half width of anisotropic magnetic distribution to the coercive force is preferably at least 3.2 to maintain erasing properties.

Examples of the inorganic powder having Mohs' hardness of 5 or higher are metal oxides, metal carbides and metal nitrides. Among them, $\alpha$-$Fe_2O_3$ (6), $Al_2O_3$ (9), $Cr_2O_3$ (9), $SiO_2$ (6), $TiO_2$ (6), $ZrO_2$ (6), SiC (9), TiC (9), h-BN (9), $Si_3N_4$, etc. are preferred. The number in the brackets indicates the Mohs' hardness. These inorganic powders are available at any particle size, and selected according to the above disclosures.

As the carbon black contained in the backcoating layer according to the present invention, channel black, furnace black, acetylene black, thermal black, etc. may be used. Among them, acetylene black is preferred.

In addition, graphired carbon black in which a carbon black particle is coated with a graphite layer as disclosed in Japanese Patent Kokai Publication No. 22424/1986 can be used.

Examples of the commercially available carbon black are Black Pearl 700 having a particle size of 18 mμ, Mogal L having a particle size of 20 mμ, ELFREX pellets-115 having a particle size of 27 mμ, Legal 300 having a particle size of 27 mμ, Vulcan XC-72 having a particle size of 30 mμ, and Sterling NS and R having a particle size of 75 mμ (all manufactured by Cabot, USA); Laben 8000 having a particle size of 13 mμ, Laben 5250 having a particle size of 20 mμ, Laben 890 having a particle size of 30 mμ, Laben 450 having a particle size of 62 mμ, Laben 410 having a particle size of 70 mμ, Laben MT-P beads having a particle size of 280 mμ (0.28 μm) and Laben Sebacalb MT-Cl having a particle size 300 mμ (0.30 μm) (all manufacture by Columbian Carbon, USA); HS-500 having a particle size of 75 mμ and #60 H having a particle size of 35 mμ (both manufactured by Asahi Carbon, Japan); Seast 5H having a particle size of 20 mμ (manufactured by Tokai Carbon, Japan); Ketchen Black EC having a particle size of 30 mμ (manufactured by Akzo, the Netherland); and #4040 having a particle size of 20 ml, #4330 BS having a particle size of 23 mμ #4350 BS having a particle size of 45 mμ and #4010 having a particle size of 80 mμ (manufactured by Mitsubishi Chemical Co., Ltd., Japan).

Since the carbon blacks having various particle sizes are easily available, they may be selected suitably in view of the major axis size of the metal magnetic powder based on the above disclosures of the present invention. When the particle size is relatively small, it is preferred for the carbon black to form aggromerates each consisting of several primary particles by utilizing its structure forming ability. In this case, the aggromerate functions as a single carbon black particle.

The inorganic powder and the carbon black are added to the magnetic paint and the backcoating paint so as to satisfy the above relationships of the particle sizes.

Examples of the binder resins contained in the magnetic layer and the backcoating layer are vinyl chloride resins (e.g. vinyl chloride/vinyl acetate copolymers, vinyl chloride/vinyl acetate/vinyl alcohol copolymers, vinyl chloride/acrylate copolymers, vinyl chloride/vinylidene chloride copolymers, vinyl chloride/acryronitrile copolymers and vinyl chloride/vinyl acetate/maleic acid copolymers), thermoplastic polyurethane resins, thermosetting polyurethane resins, polyester resins, phenoxy resins, polyvinyl buryral resins, cellulose derivatives, epoxy resins and mixtures thereof. To these resins, hydrophilic groups such as carboxylic acid groups, sulfonic acid groups, sulfonatc groups, phosphoric acid groups, phosphate groups, amine groups, or ammonium salt groups may be introduced to improve the dispersibility of the powder particles in the resins, or acrylic double bonds may be introduced to the resins so that the resins can be cured by irradiation.

Examples of the solvent to prepare the paints for the layers are alcohols (e.g. ethanol, propanol, butanol, etc.), esters (e.g. methyl acetate, ethyl acetate, butyl acetate, etc.), ketches (e.g. methyl ethyl ketone, methyl isobutyl ketone, cyclohexanone, etc.), ethers (e.g. tetrahydrofuran, dioxane, etc.), aromatic hydrocarbons (e.g. benzene, toluene, xylene, etc.), aliphatic hydrocarbons (e.g heptane, hexane, cyclohexane, etc.), chlorinated hydrocarbons (e.g. methylene chloride, ethylene chloride, chloroform, etc.) and the like. Among them, a mixed solvent of cyclohexanone and toluene is preferred.

To the above layers, a lubricant such as saturated or unsaturated higher fatty acids, higher fatty acid amides, fatty acid esters, higher alcohols, silicone oils, mineral oils, edible oils, fluorinated oils, etc. may be added as an additional additive.

The above components in predetermined amounts are dispersed with a ball mill or a sand mill to prepare the magnetic or backcoating paint and coated on the above non-magnetic substrate.

During the dispersion of the paint, it should be avoided to apply excessive force to the carbon black or inorganic powder particles to change the particle size of the carbon black which is compounded as designed.

For coating the paint, first, the magnetic paint is coated, subjected to the magnetic field orientation before drying, then subjected to the surface treatment to smooth the surface and once wound. Thereafter, the backcoating paint is formed. Such process steps are disclosed in Japanese Patent Publication No. 23647/1983.

The magnetic layer or the backcoating layer may be a single layer or a multilayer. Of course, the magnetic layer and the backcoating layer may be coated simultaneously. After coating, the magnetic recording medium is cut to a predetermined width with a slitting machine and each tape is wound on a hub with the backcoating layer inside in general and set in the cassette casing.

Since, a strong winding force is applied to the hub as a core, a sink on the peripheral surface of the hub should be controlled to less than 5 μm to prevent curling of the tape.

Since the backcoating layer contacts the tape guide means in the cassette casing, to decrease the noise, the cassette casing or at least the tape guide means is made of an ABS resin. To the resin of the cassette casing or the tape guide means, the pigment having a Mohs' hardness of 2 to 4 is added to prevent the damage of the backcoating layer. To reduce the electrostatic noise, the cassette casing may contain an antistatic agent, such as carbon black, and quaternary ammonium salt such a polyoxyethylenealkylamine, or a fluidizing agent for the molten resin, such as ethylene bisstearoamide.

The cassette casing can be produced by melting the resin composition and injection molding it in a metal mold.

By the above measures, it is possible to produce the magnetic recording medium which has high output in a short wavelength recording at a center recording wavelength of 0.8 μm and suppress the increase of the noise after storage.

PREFERRED EMBODIMENTS OF THE INVENTION

EXAMPLE I

A. Formation of a magnetic layer

In a ball mill, a composition of 100 parts of ferromagnetic metal iron powder which comprised aluminum-coated iron particles containing 0.2% by weight of manganese and 1.0% by weight of calcium based on the weight of iron and had coercive force of 1600 Oe, saturation magnetization of 120 emu/g, a major axis size of 0.18 μm and an axial ratio of 10, 10 parts by weight of a hydroxy group-containing vinyl chloride resin having a polymerization degree of 340, 7 parts by weight of a thermoplastic polyurethane resin, 8 parts by weight of alumina having a particle size of 0.2 μm, 2 parts by weight of myristic acid, 2 parts by weight of red oxide ($\alpha$-$Fe_2O_3$), 1 parts by weight of #4010 having a particle size of 80 mμ (manufactured by Mitsubishi Chemical Co., Ltd.)

and 2 parts by weight of Seast 5 H having a particle size of 20 mμ (manufactured by Tokai Carbon) as carbon black in 70 parts by weight of cyclohexanone and 70 parts by weight of toluene was mixed and dispersed for 96 hours. To the mixed composition, 5 parts by weight of a trifunctional polyisocyanate compound was added and mixed to obtain a magnetic paint. The magnetic paint was coated on a biaxially oriented polyethylene terephthalate film having a thickness of 10 μm to a layer thickness of 2.5 μm, dried and calendered to produce a magnetic recording medium.

B. Formation of a backcoating layer

In a ball mill, a composition of 60 parts by weight of Seast 5 H having a particle size of 20 mμ (manufactured by Tokai Carbon) and 7.5 parts by weight of Laben MT-P beads having a particle size of 280 mμ (0.28 μm) (manufactured by Columbian Carbon) as carbon black, 30 parts by weight of calcium carbonate having a particle size of 0.05 μm, 2.5 parts by weight of red oxide having a particle size of 0.1 μm, 45 parts by weight of a thermoplastic polyurethane resin, 40 parts by weight of nitrocellulose and 15 parts by weight of a trifunctional isocyanate cross linking agent in 330 parts by weight of cyclohexanone and 330 parts by weight of toluene was mixed and dispersed for 96 hours to obtain a backcoating paint. The backcoating paint was coated on the back of the magnetic recording medium having the coated magnetic layer to a layer thickness of 1.0 μm, dried and cured at 60° C. for 20 hours.

The total thickness of the produced magnetic recording medium was 13.5 μm. It was cut to a predetermined width to form a tape and wound with the backcoating layer being inside around a hub which had been made by injection molding of a polyoxymethylene resin with suppressing a sink around its peripheral surface to not larger than 0.1 μm.

C. Production of a cassette casing

A composition of 100 parts by weight of an ABS resin (NA-1060 manufactured by Denki-Kabaku Kogyo), 23 parts by weight of a pigment consisting of carbon black treated with Ferrocyanine Blue, 35 parts by weight of calcium carbonate (particle size, 0.5 μm), 12 parts by weight of polyoxyethylenealkylamine and 3 parts by weight of ethylenebisstearoamide was mixed in a Henschel mixer at 110° C. for one minute and extruded with a twin-screw extruder at 220° C. to produce pellets. The pellets were molten together with 1500 parts by weight of of the same ABS resin as above at 240° C. and injection molded in a mold kept at 30° C. to mold a cassette casing.

In the cassette casing, the tape wound around the hub was set to assembled a magnetic recording medium.

EXAMPLE 2

In the same manner as in Example 1 but using the same amount of Laben Sebacalb MT-Cl having a particle size of 300 mμ in place of 7.5 parts by weight of Laben MT-P beads having the particle size of 280 mμ (0.28 μm) (manufactured by Columbian Carbon) in the formation of the backcoating layer, a magnetic recording medium was produced.

EXAMPLE 3

In the same manner as in Example 1 but using the same amount of #4010 having a particle size of 80 mμ (manufactured by Mitsubishi Chemical) in place of 7.5 parts by weight of Laben MT-P beads having the particle size of 280 mμ (0.28 μm) (manufactured by Columbian Carbon) and mixing the composition in the ball mill for 22 hours instead of 96 hours in the formation of the backcoating layer, a magnetic recording medium was produced.

When the magnetic paint was observed after 22 hours mixing in the ball mill, the carbon back particles formed aggromerates each consisting of 13 particles on the average, and the size of aggromerates was 210 mμ.

EXAMPLE 4

In the same manner as in Example 1 but using the same amount of #4010 having a particle size of 80 mμ (manufactured by Mitsubishi Chemical) in place-of 7.5 parts by weight of Laben MT-P beads having the particle size of 280 mμ (0.28 μm) (manufactured by Columbian Carbon) in the formation of the backcoating layer, a magnetic recording medium was produced.

When the magnetic paint was observed after 96 hours mixing in the ball mill, the carbon back particles formed substantially no aggromerate, and the size of primary particles was 80 mμ.

EXAMPLE 5

In the same manner as in Example 1 but using the same amount of red oxide having a particle size of 0.8 μm in place of 2.5 parts by weight of red oxide having the particle size of 0.1 μm, a magnetic recording medium was produced.

Comparative Example 1

In the same manner as in Example 1 but using the same amount of ferromagnetic metal powder having coercive force of 1600 Oe, saturation magnetization of 120 emu/g, a major axis size of 0.35 μm and an axial ratio of 10 in place of the ferromagnetic metal used in the formation of the magnetic layer and the same amount of red oxide having a particle size of 0.8 μm in place of 2.5 parts by weight of the red oxide used in the formation of the backcoating layer, a magnetic recording medium was produced.

Comparative Example 2

In the same manner as in Example 1 but using the same amount of red oxide having a particle size of 0.8 μm in place of 2.5 parts by weight of the red oxide having the particle size of 0.1 μ used in the formation of the backcoating layer and the same amount of #4010 having a particle size of 80 mμ (manufactured by Mitsubishi Chemical) in place of 7.5 parts by weight of Laben MT-P beads having the particle size of 280 mμ (0.28 μm) (manufactured by Columbian Carbon), a magnetic recording medium was produced.

By using a tracer type surface roughness tester, surface roughness of the magnetic layer and the backcoating layer of each of the magnetic recording media produced in examples 1–4 and Comparative Examples 1 and 2 was measured at R of a tracer of 2 μm and a cut-off of 0.08 mm and expressed in terms of center line average roughness.

A squareness ratio and coercive force of the magnetic layer in an applied magnetic field of 10 KOe were measured.

A noise level at 6 MHz was measured by recording signals of 7 MHz and reproducing them just after wound around the hub or after 60 days storage, and expressed as a noise ratio to the noise level of Example 1 just after wound around the hub being 0 (zero) dB.

The results are shown in the following Table.

TABLE

| Example No. | Surface roughness: Magnetic layer (μm) | Surface roughness: back-coating layer (μm) | Surface roughness: Squareness ratio | Coercive force of magnetic layer (Oe) | Noise ratio before and after storage (dB) |
|---|---|---|---|---|---|
| 1 | 0.003 | 0.008 | 0.865 | 1550 | 0 |
| 2 | 0.003 | 0.008 | 0.862 | 1548 | 0 |
| 3 | 0.004 | 0.009 | 0.862 | 1550 | 0 |
| 4 | 0.004 | 0.008 | 0.865 | 1555 | +0.8 |
| 5 | 0.005 | 0.01 | 0.857 | 1540 | +1.5 |
| C. 1 | 0.006 | 0.02 | 0.83 | 1510 | +2.8 |
| C. 2 | 0.005 | 0.015 | 0.83 | 1505 | +2.5 |

As apparent from the Table, the magnetic recording media of Examples showed substantially no increase of noise after 60 days storage, while the magnetic recording media of Comparative Examples showed increase of noise after storage.

The magnetic recording medium of the present invention does not show substantial increase of noise after long term storage so that it is suitable for short wavelength recording.

The invention being thus described, it will be obvious that the same may be varied in many ways. Such variations are not to be regarded as a departure from the spirit and scope of the invention, and all such, modifications as would be obvious to one skilled in the art are intended to be included within the scope of the following claims.

What is claimed:

1. A magnetic recording assembly which comprises a magnetic tape and a cassette casing, said magnetic tape comprising a substrate, a magnetic layer on one surface of said substrate and a backcoating layer on an opposite surface of said substrate, wherein said magnetic layer contains a magnetic metal powder having a major axis size of not larger than 0.2 μm to achieve high density recording at a center recording wavelength of 0.8 μm or less and an inorganic powder having a Mohs' hardness of at least 5, said magnetic layer having a thickness not greater than 3.0 μm, a surface roughness of not greater than 0.004 μm in terms of center line average roughness, and a squareness ratio of at least 0.85 under an applied magnetic field of 10 KOe and said backcoating layer contains a carbon black and an inorganic powder having a particle size smaller than said major axis size of said magnetic metal powder, and has a surface roughness of not greater than 0.01 μm in terms of center line, and a Mohs' hardness of at least 5, and said cassette casing is made of an ABS resin containing a pigment having a Moh's hardness of from 2 to 4.

2. A magnetic recording assembly which comprises a magnetic tape comprising a substrate, a magnetic layer on one surface of said substrate and a backcoating layer on a reverse surface of said substrate for recording information at a center recording wavelength of not larger than 0.8 μm, wherein said magnetic layer has a thickness not larger than about 3.0 μm and contains a magnetic metal powder having a major axis size of not larger than 0.2 μm and an inorganic powder having a Mohs' hardness of at least 5, and said backcoating layer contains carbon black and an inorganic powder having a particle size smaller than said major axis of said magnetic metal powder, and a Mohs' hardness of at least 5 and a cassette casing made of an ABS resin containing a pigment having a Mohs' hardness of from 2 to 4.

3. A magnetic recording assembly which comprises a magnetic tape, for recording information at a center recording wavelength of no greater than 0.8 μm, said magnetic tape comprising a substrate, a magnetic layer having a thickness not larger than about 3.0 μm which contains magnetic metal powder having a major axis of 0.2 μm or less and inorganic powder having a Moh's hardness of at least 5 on one surface of said substrate and a backcoating layer which contains carbon black and an inorganic powder having a particle size smaller than a major axis size of said magnetic metal powder and a Mohs' hardness of at least 5 on a reverse surface of said substrate, a hub, said magnetic tape being wound around said hub with said backcoating layer facing inside, and a cassette casing made of an ABS resin containing a pigment having a Mohs' hardness of from 2 to 4 in which said tape wound hub is placed.

4. A magnetic recording assembly which comprises a magnetic tape comprising a substrate, a magnetic layer on one surface of said substrate and a backcoating layer on an opposite surface of said substrate, for recording information at a center recording wavelength of not larger than 0.8 μm, wherein said magnetic layer has a thickness not larger than about 3.0 μm and has a surface roughness of not larger than 0.004 μm in terms of center line average roughness and a squareness ratio of at least 0.85 at an applied magnetic field of 10 KOe and contains magnetic metal powder having a major axis of 0.2 μm or less and an inorganic powder having a Mohs' hardness of at least 5, and said backcoating layer has a surface roughness of not larger than 0.01 μm in terms of center line average roughness and contains carbon black and an inorganic powder having a particle size smaller than said major axis size of said magnetic metal powder, and a Mohs' hardness of at least 5 and a cassette casing made of an ABS resin containing a pigment having a Mohs' hardness of from 2 to 4.

5. A magnetic recording assembly which comprises a magnetic tape comprising a substrate, a magnetic layer on one surface of said substrate and a backcoating layer on an opposite surface of said substrate, for recording information at a center recording wavelength of not longer than 0.8 μm, wherein said magnetic layer has a thickness not larger than about 3.0 μm and has a surface roughness of not larger than 0.004 μm in terms of center line average roughness and a coercive force of at least 1500 Oe and contains a magnetic metal powder having a major axis of 0.2 μm or less and inorganic powder having a Mohs' hardness of at least 5, and said backcoating layer has a surface roughness of not larger than 0.01 μm in terms of center line average roughness and contains carbon black and an inorganic powder having a particle size smaller than said major axis size of said magnetic metal powder, and a Mohs' hardness of at least 5 and a cassette casing made of an ABS resin containing a pigment having a Mohs' hardness of from 2 to 4.

6. A magnetic recording assembly comprising magnetic tape comprising a substrate, a magnetic layer on one surface of said substrate and a backcoating layer on an opposite surface of said substrate, wherein said magnetic layer has a thickness not larger than about 3.0 μm and contains a magnetic metal powder having a major axis of 0.2 μm or less to achieve high density recording at a center recording wavelength of 0.8 μm or less and an inorganic powder having a Mohs' hardness of at least 5, and said backcoating layer contains carbon black and an inorganic powder having a particle size smaller than said major axis size of said magnetic metal powder and a Mohs' hardness of at least 5, a total thickness of said tape being not larger than 14 μm and a cassette casing made of an ABS resin containing a pigment having a Mohs' hardness of from 2 to 4.

7. A magnetic recording medium which comprises a substrate, a magnetic layer on one surface of said substrate and a backcoating layer on a reverse surface of said substrate, wherein said magnetic layer has a thickness not larger than about 3.0 μm and contains a magnetic metal powder having a major axis of 0.2 μm or less to achieve high density recording at a center recording wavelength of 0.8 μm or less which comprises iron and at least 0.1% by weight of manganese based on a weight of said iron, and an inorganic powder having a Mohs' hardness of at least 5, and said backcoating layer contains carbon black and an inorganic powder having a particle size smaller than said major axis size of said magnetic metal powder, and a Mohs' hardness of at least 5 and a cassette casing made of an ABS resin containing a pigment having a Mohs' hardness of from 2 to 4.

8. A magnetic recording assembly which comprises a magnetic tape comprising a substrate, a magnetic layer on one surface of said substrate and a backcoating layer on an opposite surface of said substrate, wherein said magnetic layer has a thickness not larger than about 3.0 μm and contains a magnetic metal powder having a major axis of 0.2 μm or less to achieve high density recording at a center recording wavelength of 0.8 μm or less which comprises iron, manganese and an alkaline earth metal and an inorganic powder having a Mohs' hardness of at least 5, and said backcoating layer contains carbon black and an inorganic powder having a particle size smaller than said major axis size of said magnetic metal powder and a Mohs' hardness of at least 5 and has a surface roughness in terms of center line average surface roughness smaller than said major axis size of said magnetic metal powder and a cassette casing made of an ABS resin containing a pigment having a Mohs' hardness of from 2 to 4.

9. A magnetic recording medium which comprises a substrate, a magnetic layer on one surface of said substrate and a backcoating layer on an opposite surface of said substrate, wherein said magnetic layer has a thickness not larger than about 3.0 μm and contains a magnetic metal powder having a major axis of 0.2 μm or less to achieve high density recording at a center recording wavelength of 0.8 μm or less [which comprises iron, manganese and an alkaline earth metal and an inorganic powder having a Mohs' hardness of at least 5], and said backcoating layer contains carbon black [and an inorganic powder] having a particle size [smaller] *larger* than said major axis size of said magnetic metal powder [and a Mohs' hardness of at least 5 and has a surface roughness in terms of center line average surface roughness smaller than said major axis size of said magnetic metal powder].

10. A magnetic recording assembly which comprises a magnetic tape comprising a substrate, a magnetic layer on one surface of said substrate and a backcoating layer on an opposite surface of said substrate, wherein said magnetic layer has a thickness not larger than about 3.0 μm and contains a magnetic metal powder having a major axis of 0.2 μm or less to achieve high density recording at a center recording wavelength of 0.8 μm or less, said backcoating layer contains carbon black and an inorganic powder having a particle size smaller than said major axis size of said magnetic metal powder and a Mohs' hardness of at least 5 and has surface roughness in terms of center line average surface roughness smaller than said major axis size of said magnetic metal powder, and a total thickness of said substrate, said magnetic layer and said backcoating layer is not larger than 14 μm and a cassette casing made of an ABS resin containing a pigment having a Mohs' hardness of from 2 to 4.

11. A magnetic recording assembly which comprises a magnetic tape comprising a substrate, a magnetic layer on one surface of said substrate and a backcoating layer on an opposite surface of said substrate for recording information at a center recording wavelength of not larger than 0.8 μm, wherein said magnetic layer has a thickness not larger than about 3.0 μm and contains a magnetic metal powder having a major axis of 0.2 μm or less to achieve high density recording at a center recording wavelength of 0.8 μm or less and an inorganic powder having a Mohs' hardness of at least 5, and said backcoating layer contains carbon black which comprises primary particles or agglomerates having a particle size larger than said major axis size of said magnetic metal powder and a cassette casing made of an ABS resin containing a pigment having a Mohs' hardness of from 2 to 4.

12. A magnetic recording assembly comprising a magnetic tape which comprises a substrate, a magnetic layer having a thickness not larger than about 3.0 μm and which contains magnetic metal powder having a major axis of 0.2 μm or less and inorganic powder having a Mohs' hardness of at least 5 on one surface of said substrate and a backcoating layer which contains carbon black which comprises primary particles or agglomerates having a particle size larger than said major axis size of said magnetic metal powder on an opposite surface of said substrate and which is used for recording information at a center recording wavelength of not longer than 0.8 μm, a hub around which said magnetic tape is wound with said backcoating layer facing inside and a cassette casing in which said tape wound hub is set made of an ABS resin containing a pigment having a Mohs' hardness of from 2 to 4.

*13. A magnetic recording medium comprising a substrate, a magnetic layer on one surface of said substrate and a backcoating layer on an opposite surface of said substrate, wherein said magnetic layer contains a magnetic metal powder having a major axis of not larger than 0.2 μm and an inorganic powder having a Mohs' hardness of at least 5, said magnetic layer having a thickness not greater than 3.0 μm, and said backcoating layer contains carbon black which comprises primary particles or agglomerates having a particle size larger than said major axis of said magnetic metal powder.*

*14. The magnetic recording medium according to claim 9, wherein said magnetic metal powder comprises iron, manganese and an alkaline earth metal.*

*15. The magnetic recording medium according to claim 14, wherein said magnetic layer includes an inorganic powder having a Mohs' hardness of at least 5.*

*16. The magnetic recording medium according to claim 15, wherein said backcoating layer contains an inorganic powder.*

*17. The magnetic recording medium according to claim 16, wherein said inorganic powder has a particle size smaller than said major axis size of said magnetic metal powder.*

*18. The magnetic recording medium according to claim 17, wherein said inorganic powder has a Mohs' hardness of at least 5.*

*19. The magnetic recording medium according to claim 18, wherein said inorganic powder has a surface roughness in terms of center line average surface roughness smaller than said major axis size of said magnetic metal powder.*

*20. The magnetic recording medium according to claim 9, wherein said magnetic layer includes an inorganic powder having a Mohs' hardness of at least 5.*

*21. The magnetic recording medium according to claim 9, wherein said backcoating layer contains an inorganic powder.*

*22. The magnetic recording medium according to claim 21, wherein said inorganic powder has a particle size smaller than said major axis size of said magnetic metal powder.*

*23. The magnetic recording medium according to claim 21, wherein said inorganic powder has a Mohs' hardness of at least 5.*

*24. The magnetic recording medium according to claim 21, wherein said inorganic powder has a surface roughness in terms of center line average surface roughness smaller than said major axis size of said magnetic metal powder.*

*25. The magnetic recording medium according to claim 21, wherein said inorganic powder is a metal oxide.*

*26. The magnetic recording assembly according to claim 25, wherein said metal oxide is at least one metal oxide selected from the group consisting of* $\alpha$-$Fe_2O_3$ *and* $Al_2O_3$.

*27. The magnetic recording medium according to claim 9, wherein said carbon black comprises primary particles or agglomerates.*

*28. The magnetic recording medium according to claim 9, wherein a total thickness of said substrate, said magnetic layer and said backcoating layer is not larger than 14 μm.*

*29. The magnetic recording medium according to claim 9, wherein said magnetic metal powder has a coating of an oxide of at least one metal selected from the group consisting of iron, aluminum and silicon.*

*30. The magnetic recording medium according to claim 9, wherein said magnetic layer has a squareness ratio of at least 0.85 under an applied magnetic field of 10 KOe.*

*31. The magnetic recording medium according to claim 9, wherein said magnetic layer has a surface roughness of not larger than 0.004 μm in terms of center average roughness.*

*32. The magnetic recording medium according to claim 9, wherein said backcoating layer has a surface roughness of not larger than 0.01 μm in terms of center average roughness.*

*33. The magnetic recording medium according to claim 9, wherein said carbon black comprises primary particles.*

*34. The magnetic recording medium according to claim 9, wherein said carbon black comprises agglomerates.*

*35. The magnetic recording medium according to claim 9, wherein said magnetic layer has a coercive force of at least 1500 Oe.*

*36. The magnetic recording medium according to claim 9, wherein said substrate is made of a biaxially oriented polyester.*

*37. The magnetic recording medium according to claim 9, wherein said magnetic tape is wound around a hub with said backcoating layer facing inside.*

*38. The magnetic recording medium according to claim 37, wherein said hub has a sink of less than 5 μm on the peripheral surface.*

*39. The magnetic recording medium according to claim 9, further comprising a cassette casing made of an ABS resin containing a pigment having a Mohs' hardness of from 2 to 4.*

* * * * *